United States Patent [19]

Hamel

[11] Patent Number: 5,368,080
[45] Date of Patent: Nov. 29, 1994

[54] APPARATUS AND METHOD FOR A BOARD INFEED SYSTEM

[75] Inventor: Gérald Hamel, St-Ephrem, Canada

[73] Assignee: Industries P.H.L. Inc., Quebec, Canada

[21] Appl. No.: 90,431

[22] Filed: Jul. 9, 1993

[30] Foreign Application Priority Data

Jun. 30, 1993 [CA] Canada .................. 2099435

[51] Int. Cl.$^5$ .......... B27B 1/00; B27B 31/00; B26D 5/00
[52] U.S. Cl. .................. 144/357; 83/365; 83/367; 144/242 R; 144/242 M; 144/242 A; 144/246 R; 144/246 E; 144/249 A; 144/376; 198/457; 198/464.3; 198/624
[58] Field of Search .......... 198/457, 464.2, 464.3, 198/624; 414/788.8; 250/561; 83/365, 367; 144/3 R, 242 R, 242 M, 245 R, 245 A, 246 R, 246 E, 249 R, 249 A, 376

[56] References Cited

U.S. PATENT DOCUMENTS

| | | | |
|---|---|---|---|
| 1,853,773 | 4/1932 | McDonough | 262/83 |
| 3,084,726 | 4/1963 | Dennison | 144/13 |
| 3,736,968 | 6/1973 | Mason | 144/3 R |
| 3,963,938 | 6/1976 | Sanglert | 250/561 |
| 3,983,403 | 9/1976 | Dahlstrom et al. | 144/357 |
| 4,086,496 | 4/1978 | Berry | 250/561 |
| 4,240,477 | 12/1980 | Horn et al. | 144/245 |
| 4,269,245 | 5/1981 | Fornell et al. | 144/245 A |
| 4,340,137 | 7/1982 | Foster | 144/245 A |
| 4,383,561 | 5/1983 | Gregoire et al. | 144/245 |
| 4,468,992 | 9/1984 | McGeehee | 83/56 |
| 4,471,823 | 9/1984 | Wadell | 144/246 |
| 4,546,440 | 10/1985 | Palmberg | 364/475 |
| 4,977,805 | 12/1990 | Corley, III | 83/76.8 |
| 5,099,896 | 3/1992 | Ritola | 144/357 |
| 5,115,846 | 5/1992 | Miller et al. | 198/457 |

*Primary Examiner*—W. Donald Bray
*Attorney, Agent, or Firm*—Michael, Best & Friedrich

[57] ABSTRACT

A board edging infeed optimization system is described. The infeed system is equipped with a conveyor which transversely advances the board, a conventional optical scanning station, and a computer which calculates a longitudinal reference datum line and a preferred edging path for the board and places movable positioning pegs at a predetermined distance away from the preferred edging path. A novel mechanism is used to seize and transport the board further along the path by the predetermined distance so that the board's longitudinal reference datum line is placed colinear with the preferred infeed line into the edging device. The novel mechanism is characterized by the use of rotatable eccentric arm which sequentially advance and retract movable clamping jaws. After the board is placed along its preferred infeed line, grip rollers can longitudinally feed it into the edging device. If required, friction shoes may be installed directly above the general location of the positioning pegs to ensure that the advancing boards will sequentially come to rest in abutment with the positioning pegs and will not bounce or slide out of position. The eccentric arm assembly can optionally be provided with fluid operated telescopic arms which can be quickly adjusted to allow the infeed optimization system to selectively feed boards to a plurality of adjacent edging devices.

18 Claims, 8 Drawing Sheets

APPARATUS AND METHOD FOR A BOARD INFEED SYSTEM

BACKGROUND OF THE INVENTION

1. Field of the Invention

This invention relates in general to sawmill equipment, and more particularly to an apparatus and method for positioning boards to be fed through board edging saws to expose maximum usable dimensioned lumber therefrom. In greater particularity, the present invention relates to an infeed table system for a board edge trimming device.

2. DESCRIPTION OF THE PRIOR ART

The boards handled by the infeed table are sawn cants. Cants are commonly described as planks of portions of logs after longitudinal ripsawing. They generally have flat top and bottom horizontal surfaces and unfinished and irregular longitudinal sides surfaces, called wane edges, which may still have bark. To produce dimensioned lumber, wane edges require to be eliminated. Conventionally an edging saw assembly will comprise at least two circular saws removing the wane edges of the board.

Numerous computer controlled systems have been developed to optimize the trimming of wane edges of boards to produce dimensioned lumber while minimizing waste. Optimization is obtained, for example, by using optical scanners which relay data on the specific morphology of a board to a computer which receives and analyses the data to control the board edge trimming process. The optical scanning method consists of transversely moving a board across light beams located at various points along the length of the board such that the light beam is interrupted and the restored as the board passes. The resultant measurement data is then fed to a computer which will compute a prescribed edging cut to maximize the production of useful dimensioned lumber. The computer will then control equipment which will effect such a preferred cut. Various examples of such systems are disclosed in the Sanglert U.S. Pat. No. 3,963,938 issued Jun. 15, 1976, in the Berry U.S. Pat. No. 4,086,496 issued Apr. 25, 1978, in the McGeehee U.S. Pat. No. 4,468,992 issued Sep. 4, 1984, and in the Wadell U.S. Pat. No. 4,471,823 issued Sep. 18, 1984.

With optical scanning systems, optimization of the edge trimming process is achieved in either of two ways. According to a first method, the edge trimming saws can be laterally adjustable relative to a constant edging path followed by every board as shown for example, by Sanglert U.S. Pat. No. 3,886,372. However, such methods require the replacement, at a great expense, of existing non-laterally adjustable board edging saw equipment with new computer controlled laterally adjustable board edging equipment. Consequently, such methods have failed to gain recognition and have failed in replacing conventional equipment.

In another method, optimization is achieved with conventional fixed position edge saws but the boards are precisely aligned on an preferred edging path determined by the computer based on the optical scanning data. This permits computer controlled cutting optimization systems to be used with existing fixed position board edging equipment (Horn et al U.S. Pat. No. 4,240,477). More particularly, Horn et al disclose a computer controlled alignment system using a movable mounting frame. Boards are laid on the mounting frame which is displaced, transversely to the edging path, to a final position which is computed to align the board with a preferred edging path and allow the board to be propelled by spiked feed rollers along the preferred edging path. The mounting frame slides on ball bearings on beams which are themselves bolted to the floor of the mill. Such systems have the inherent and severe drawback that they fail to be operable at the high processing speeds required in modern and efficient milling operations. To be more explicit, in the system disclosed by Horn et al, the mounting frame is moved by hydraulic cylinders. In addition, shock dampers are provided at each extremity of the range of movement of the mounting frame. In use, the mounting frame will slam against the hydraulic shock dampers and the momentum carried by the mounting frame will be transmitted to the support structure holding the hydraulic shock dampers and finally to the mill floor. If the system is accelerated, the slamming effect will in all probability increase to a point where the lumber resting on the mounting frame will skid on it and lose its alignment along the preferred edging path. This is especially true when slippery wet or frozen boards are being processed. More importantly, the entire assembly will become subjected to important structural shocks and will be prone to breakdowns.

Thus the need exists for board infeed optimization equipment which can smoothly and quickly position a board along a preferred edging path while being operable in conjunction with a conventional optical scanning system and conventional fixed woodworking equipment such as a fixed position edging device.

SUMMARY OF THE INVENTION

It is, therefore, an object of this invention to provide a board infeed optimization system capable of smoothly and quickly moving boards transversely to a position aligned with a preferred edging path to permit a conventional optical scanning system and a computer controller to be used with conventional fixed edging equipment.

It is a further object of this invention to provide a board infeed optimization system which can be used with an optical scanning device and a computer controller to select one from a plurality of preferred edging paths leading to different fixed edging devices and capable of smoothly and quickly positioning the boards along this most preferred edging path.

It is still a further object of this invention to provide a computer controlled board infeed optimization system which prevents boards from slipping, bouncing, or sliding during their positioning in alignment with a preferred edging path.

In accordance with these and other objects of the invention, a board edging infeed optimization system is capable of positioning an elongate cant, in an infeed line of direction generally parallel to its elongate axis, to an edging device capable of cutting the cant along parallel, spaced-apart cutting lines, to remove the wane edges thereof, the apparatus comprises:

conveying means for conveying the cant in a direction transverse to its elongate axis and along a substantially straight path;

scanning means located along the path for optically scanning the morphology of the cant, linked to a computer for analyzing the morphology data and determining a preferred infeed line of direction into said edging device;

positioning means located further along the path for positioning the cant in a direction transverse to its elongate axis and at a location remote from the preferred infeed line of direction;

means coupled to rotatable eccentric arm means and capable of seizing the cant, displacing the cant further along the path and positioning and releasing the cant in a direction transverse to its elongate axis and colinear with the preferred infeed line of direction;

feeding means for advancing the cant, in a direction colinear with the preferred infeed line of direction and into said edging device;

According to a preferred embodiment, the apparatus comprises a conventional optical scanning station; a computer controller which will analyze data from the optical scanning station and place movable positioning pegs at a set distance from preferred edging paths for the board; a mechanism providing transverse advancement of the bord along the path culminating in a rest position in abutment with positioning pegs; a grip roller assembly adapted to clamp a board; an eccentric arm system linked to the grip roller assembly and capable of displacing it together with a clamped board therein, by a further set lateral distance along the path, of the thereby positioning the board in longitudinal alignment with its preferred infeed line; and a further grip roller assembly adapted to longitudinally thrust the board into the edging device.

If required, friction shoes may be installed directly above the general location of the positioning pegs to ensure that the advancing boards will sequentially come to rest in abutment with the positioning pegs and will not bounce or slide out of position.

According to a possible embodiment of the invention, the eccentric arm and the advancement system are activated by a motors through chain drives.

According to a possible embodiment of the invention, the positioning pegs are displaced by two arms linked to two computer controlled linear positioning hydraulic cylinder systems.

Also according to a possible embodiment, the eccentric arm assembly may be adjustable to permit to selectively feed boards into a plurality of adjacent edging devices.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF THE PREFERRED EMBODIMENTS

Figure 1:
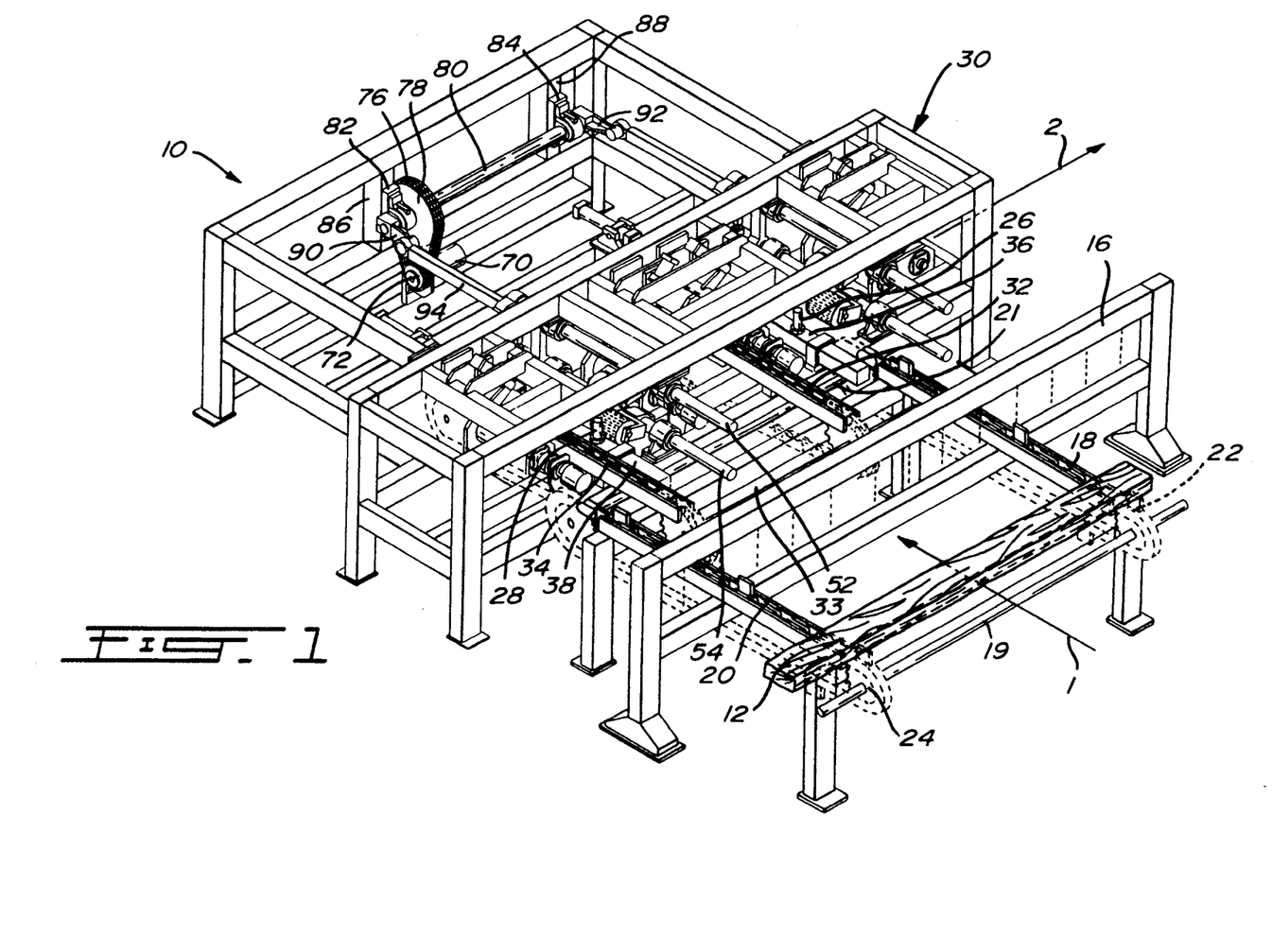
FIG. 1 is a perspective view showing the board edging infeed optimization system in accordance with the present invention which comprises apparatus to transport boards trough a scanning station and further transport the boards to reach longitudinal alignment with a preferred board edging path.

Referring now to FIG. 1 of the drawings, an infeed optimization system 10 is shown for feeding boards through longitudinal edge trimming saws (not shown) called edgers. The aim of the system 10 is to automatically select a preferred feeding path, smoothly and rapidly transport the boards to a position in alignment with the preferred feeding path and to propel the boards through the edger in order to expose the optimum amount of useful dimensioned lumber. A board 12 will enter the infeed system 10 transversely in the general direction indicated by arrow 1. The infeed system 10 will continue to displace the board 12 transversely until the board 12 reaches alignment with its preferred longitudinal feeding path in the general direction indicated by arrow 2 to enter an edger unit (not shown).

Figure 2:
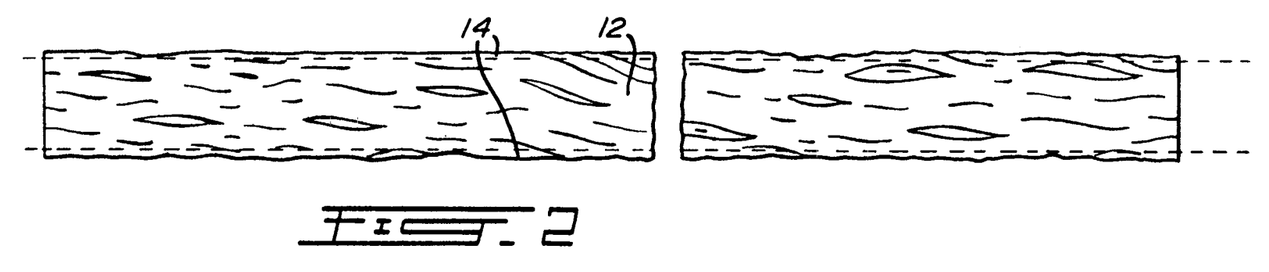
FIG. 2 is a plan view of a cant, i.e. a board with rough side edges, with projected edge trimming cut lines as determined by the optimization system in accordance with the present invention.

Turning now to FIG. 2, the boards 12 handled by the system 10 are cants having wane edges 14 which may still exhibit bark. These wane edges 14 require to be eliminated to obtain useful dimensioned lumber. The dotted lines shown on board 12 are representative of the preferred trimming lines as calculated by a computer (not shown) from optical data provided by an optical scanning station 16 as shown in FIG. 1. The edger unit (not shown) is conventional and comprises non-laterally displaceable saws. Thus, to optimize the edge trimming process, the feeding path of the board 12 through the edger unit (not shown) is the only variable to be adjusted to allow optimization of the wane edge 14 removal.

Referring again to FIG. 1 of the drawings, a board 12 enters the system 10 on transverse transport endless chains 18 and 20 located below and generally under the longitudinal end portions of board 12. The board 12 is pushed forward transversely by pushing lugs 22 and 24 projecting upwardly at regular intervals on endless chains 18 and 20, respectively. In this way a board 12 will transversely travel through the optical scanning station 16 located above and below the board 12. Transverse transport endless chains 18 and 20 are supported and advanced in unison by pairs of co-axial sprocket wheels (typically shown in FIG. 6 at 17) and mounted on common axles (typically shown in FIG. 1 at 19). The assembly of sprocket wheels 17 is motorized by torque axle 19 which is driven by a suitable electric motor (not shown).

The optical scanning station 16 may be of conventional commercially available manufacture such as an Autolog ® scanning station. The optical scanning station will measure the specific morphology of board 12. The morphology data provided by the optical scanning station 16 is relayed to a computer (not shown) by appropriate transducers (not shown) and wires (not shown). The computer will then calculate the best manner to further process a board 12 in order to remove its wane edges 14. More particularly, the computer will calculate the location of a preferred longitudinal feeding path to the edger unit (not shown) corresponding to an optimum trimming and removal of the wanes edges 14 on each board 12. The computer will consequently calculate the amount of further transverse transport each board 12 will require for it to reach longitudinal alignment with its preferred feeding path. The equipment of infeed system 10 is designed to transversely transport a board 12 in two distinct steps. In the first step board 12 will be transversely displaced by a variable distance X. In the second step board 12 will be further transversely displaced by a constant distance C. This two step operation is calculated to provide enough transverse movement of board 12 for it to reach longitudinal alignment with its preferred feeding path as calculated by the computer (not shown). The overall transverse movement can easily be summarized by the following formula:

$$X + C = PFA$$

where

X = variable transverse distance
C = constant transverse distance
PFA = preferred feeding alignment into edger unit first travel a variable transverse distance and then travel a further constant transverse distance.

To effect the required variable distance X of transverse transport of board 12, the computer will control and position linearly displaceable positioning pegs 26 and 28. Board 12 will transversely advance on endless transverse transport chains 18 and 20 and will be gradually be transferred onto parallel endless transverse transport chains 32 and 34 to reach abutment on positioning pegs 26 and 28. Transport chains 32 and 34 are supported and advanced in unison by pairs of co-axial sprocket wheels (typically shown in FIG. 6 at 31) mounted on common axles (typically shown in FIG. 1 at 33). The assembly of sprocket wheels 31 is motorized by torque axle 33 which is driven by a suitable electric motor (not shown).

It is to be understood that transport chains 18, 20, 32, and 34 are driven in unison at a chosen linear velocity to transversely advance board 12. The linear velocity in calculated by the computer (not shown) so that the overall infeed system 10 can operate at a chosen pace.

To effect the required further constant distance C of transverse transport of board 12, the computer will automatically direct equipment to seize board 12, transversely transport it by the constant distance C and lower board 12 onto appropriately spiked feed rollers which will propel board 12 into the edger unit (not shown) that is in the general direction indicated by arrow 2 in FIG. 1.

The movement of board 12 through infeed system 10 will now be tracked and described in further detail. Similarly the equipment comprised in infeed system 10 will also be described in more detail.

Figure 3:
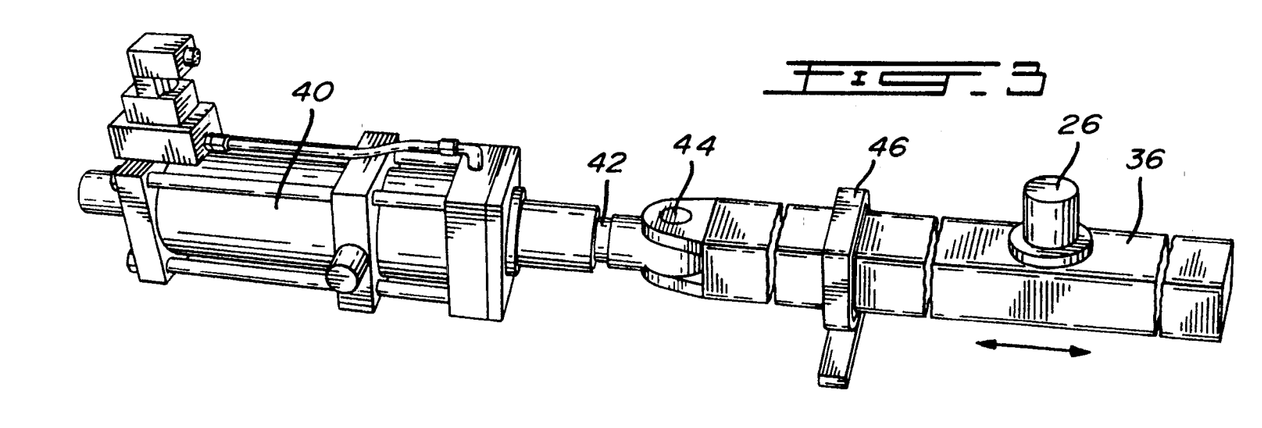
FIG. 3 is a fragmentary perspective view of an hydraulic linear positioning cylinder assembly comprising an positioning stop which is positioned at a set distance away from a preferred board edging path.

Once a board 12 has been scanned as described above, the board 12 will enter the infeed station 30 while transversely displaced by riding on the pair of endless transport chains 18 and 20. In entering infeed station 30 the board 12 is transferred onto and continues to advance on a second pair of endless transverse transport chains 32 and 34 until it reaches a position of abutment on positioning pegs 26 and 28. Positioning pegs 26 and 28 are vertically and fixedly inserted on linearly movable beams 36 and 38, respectively. Referring now to FIG. 3, the linear positioning of each of movable beams 36 and 38 is under the control of the computer (not shown) and is effected by an hydraulic servo linear positioner cylinder 40 (shown in FIG. 3) of commercially available manufacture such as a LinearLogic ® servo positioner cylinder. Each of movable beams 36 and 38 is linked to the push rod 42 of a servo linear positioner cylinder 40 by a suitable connection 44 and will easily slide in support rings 46 conveniently lubricated and placed at regular intervals along the length of beams 36 and 38.

Board 12 having then travelled the computed variable transverse distance X specific to its morphology, board 12 will then be seized by clamping means and further displaced transversely by the constant transverse distance C. The resulting position of board 12 will then be in alignment with its preferred feeding path.

This invention is, among other characteristics, particularly concerned with the further transverse movement corresponding to transverse distance C., that is in the general direction indicated by arrow 1 in FIG. 1 and generally transverse to the infeed direction into the edger unit (not shown) in the general direction indicated by arrow 2 in FIG. 1. This operation is effected, in general terms, by seizing board 12 with a pair of slidable clamping assemblies (typically shown at 48) in FIG. 7 and sliding the clamping assemblies 48 along the transverse distance C and subsequently releasing board 12 in a position of longitudinal alignment with its preferred feeding path. This operation, to be profitable, requires to be effected precisely, quickly and smoothly to allow the infeed system 10 to operate at a high production rate. Still referring to FIG. 7, it has been discovered that by using a pair of eccentric arm assemblies (typically shown at 50) of the present invention, it is possible to reach these objectives. An eccentric arm assembly 50 incorporates the important benefit of being able to cause a smooth and rapid longitudinal back and forth sliding movement of a clamping assembly 48 while minimizing structural stresses on the infeed system 10 during acceleration and deceleration of said clamping assembly 48.

Figure 4:
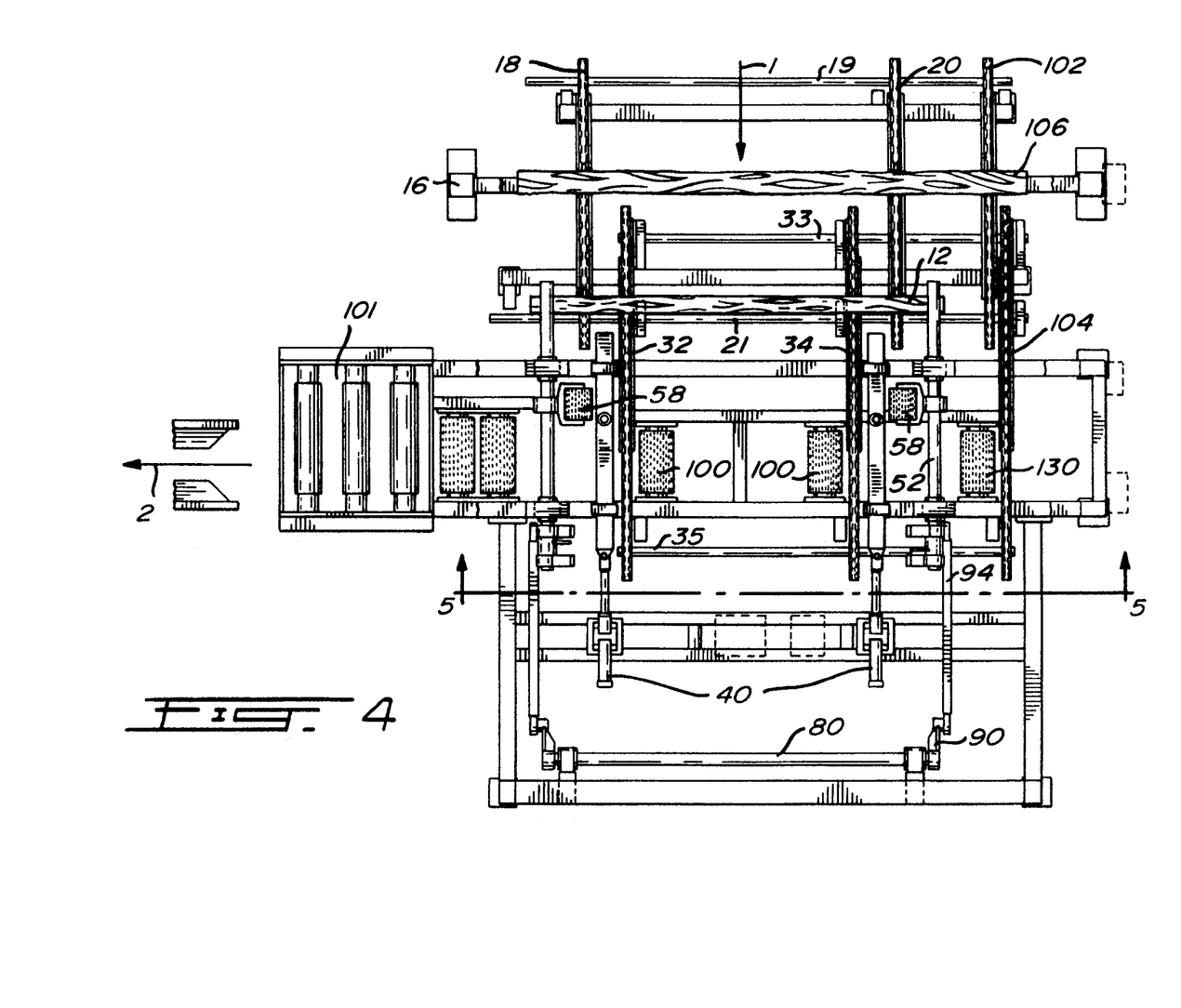
FIG. 4 is a top view of the board edging infeed optimization system in accordance with the present invention and adapted to feed boards to a fixed position edging saw assembly.
Figure 5:
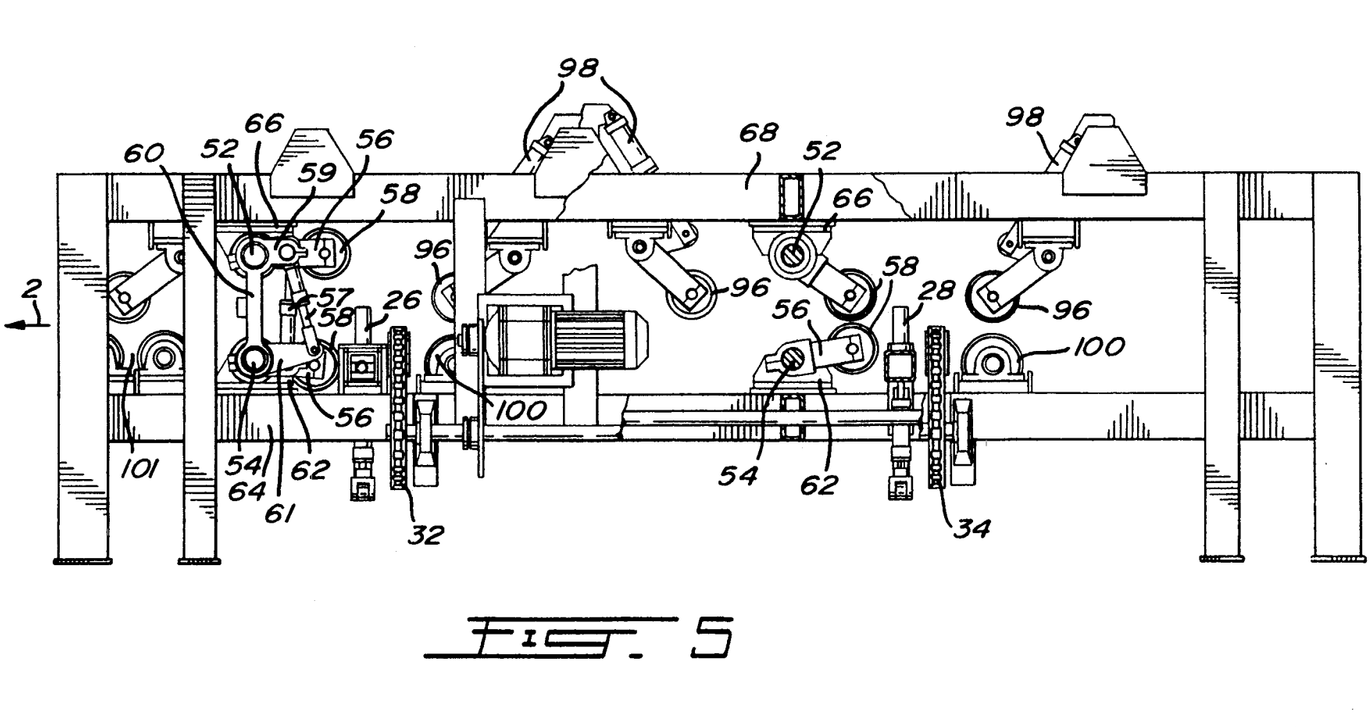
FIG. 5 is a fragmentary vertical front elevational view of the machine shown in FIGS. 1 and 4, taken generally along line 5—5 on FIG. 4.

Referring now to FIGS. 4 and 5, clamping assembly 48 comprises a pair of top and bottom parallel shafts 52 and 54 located just above and below the plane of movement of board 12 and on each of which is fixedly a mounted a support bracket 56 holding a rotatable spiked roller 58. Both top and bottom shafts are rotatably mounted at their back longitudinal ends on rear bracket 60 so as to be longitudinally movable, in unison, when rear bracket 60 is moved by the eccentric arm assembly 50. Bottom shaft 54 is longitudinally slidable on bottom support sleeves (typically at 62) fixedly mounted on support beam (typically at 64 and shown in dotted lines) 64. Top shaft 52 is also longitudinally slidable this time on top support rotatable sleeves (typically at 66) fixedly mounted on support beam (typically at 68 and shown in dotted lines). Both top shaft 52 and bottom shaft 54 are rotatable under the power of a pair of hydraulic cylinders (typically at 57) each mounted at opposite their ends on rotation arms 59 and 61 which are themselves fixedly mounted, in convenient interstices through rear bracket 60, around top shaft 52 and bottom shaft 54, respectively. The servo hydraulic cylinders 57 are under the control of the computer which will direct them, at the appropriate time, to rotate expand thereby rotating to shaft 52 and bottom shaft 54 in opposite directions thereby enabling to approach the top spiked roller 58 towards its bottom counterpart to effectively clamp a board 12. Hence, servo hydraulic cylinders 57 under the control of the computer (not shown) can be made to expand thereby clamping together spiked rollers 58 and later caused to contract thereby distancing spiked rollers 58. It is to be understood that when the spiked rollers 58 have clamped a board 12, the rear bracket 60 can immediately thereafter be displaced backwards to cause the required transverse movement, in unison, of clamping assembly 48 and board 12 in the direction indicated by arrow 1. Once board 12 has completed its transverse movement, it would then be in longitudinal alignment with its preferred feeding path and the servo hydraulic cylinders 57 would then be directed by the computer to rotate top shaft 52 and bottom shaft 54 to their initial positions thereby releasing board 12 for further processing. Immediately thereafter, rear bracket 60 along with clamping assembly 48 would be slid back to their initial position in readiness for clamping and moving the next board 12.

Figure 7:
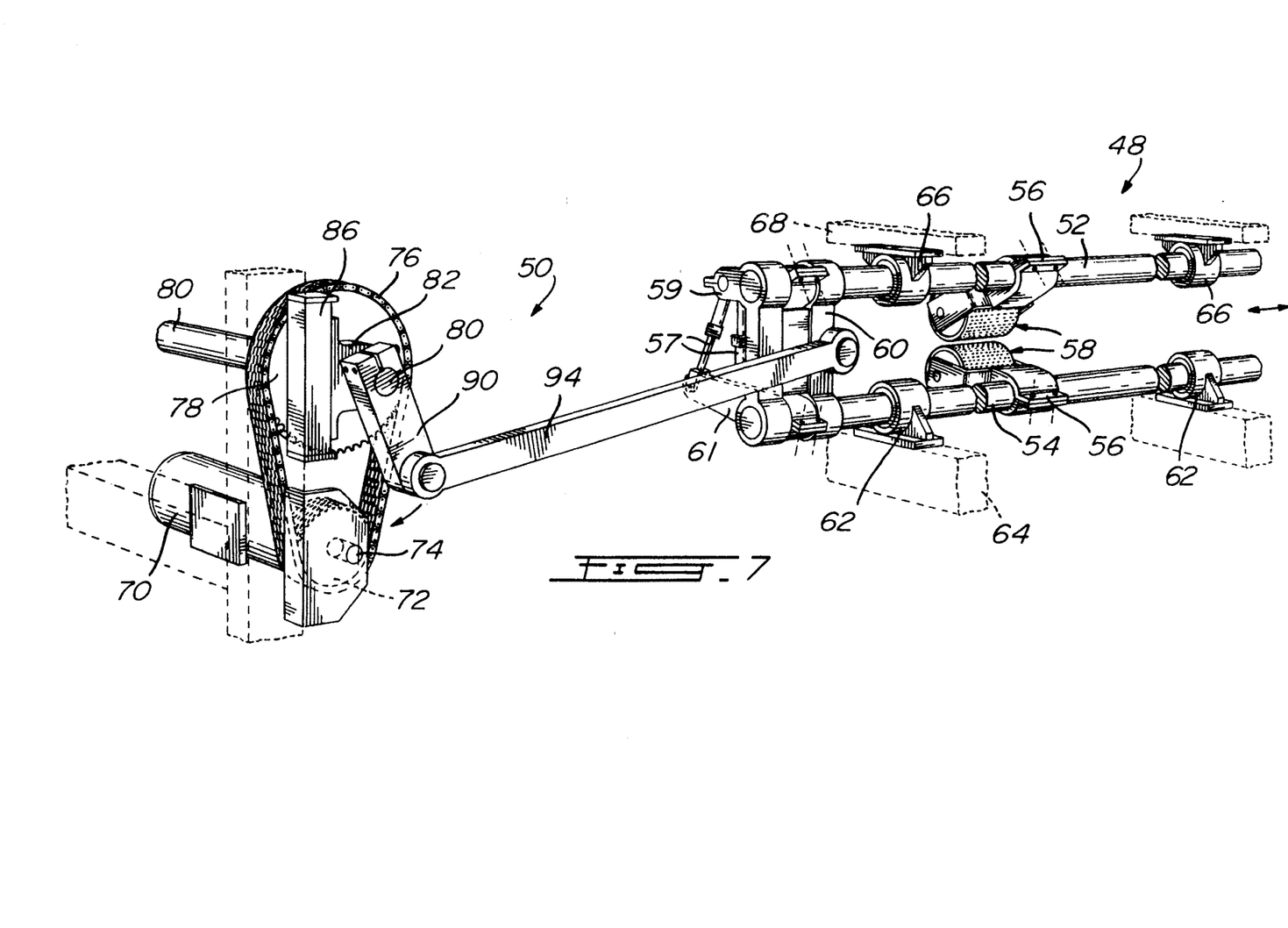
FIG. 7 is a fragmentary perspective view of the eccentric arm mechanism effecting transverse transport of the boards to position the boards in alignment with their preferred edging paths in accordance with the present invention.

Referring now to FIGS. 1 and 7, a preferred embodiment of eccentric arm assembly 50 will now be described in further detail. In FIG. 7 there is shown a schematic view of eccentric arm assembly 50. The assembly 50 is powered by a suitable hydraulic motor 70 under the control of the computer. A sprocket wheel 72 is mounted on the output shaft 74 (shown in dotted lines) of the motor 70 and is linked by chain 76 to a larger sprocket drive wheel 78. Referring also to FIG. 1, torque shaft 80 is fixedly mounted through drive wheel 78 and will therefore rotate in unison with drive wheel 78. Torque shaft 80 is rotatably supported on bearing packed sleeve blocks 82 and 84 themselves bolted to support beams 86 and 88, respectively. On both longitudinal ends of cross-shaft 80, there are fixedly mounted similar eccentric arms 90 and 92. The eccentric arm assembly 50 will now only be further described with regards to its side closest to drive wheel 78. It is to be understood that a similar mechanism is present at the other longitudinal end of torque shaft 80 as can be seen in FIG. 1. It is also to be understood that both sides of eccentric arm assembly 50 move in unison under the power of electric motor 70 because of the torque shaft 80.

Turning again to FIG. 7 eccentric arm 90 is fixedly mounted near one of its ends onto torque shaft 80. Sleeve block 82 remains in a support position between drive wheel 78 and eccentric arm 90. On the other end of eccentric arm 90 there is pivotally connected the proximate end of a linking member 94. At its distal end, linking member 94 is also pivotally connected to rear bracket 60. In operation, the rotation of torque shaft 80 will be powered by drive wheel 78 under control of the computer. Upon rotation of torque shaft 80, eccentric arm 90 will alternatively pull or push linking member 94 together with rear bracket 60, top shaft 52, and bottom shaft 54. This back and forth movement will correspond to the constant transverse distance C travelled by each board 12. The eccentric arm assembly 50 embodies the important benefit of gradually accelerating and decelerating clamping assembly 48. The length of eccentric arm 90 and the gear ratio of drive wheel 78 to sprocket wheel 72 is of course chosen to effect movement of clamping assembly 48 equal to the constant distance C and at a suitable pace during operation. Ideally, these components would be sized so that motor 70 would operate in a single direction and briefly pause when the eccentric arm assembly 50 is in full extension (as shown for example in FIGS. 1 and 6) to allow clamping of a board 12, and resume its rotative energy and briefly pause again when the eccentric arm assembly 50 is in complete retraction to allow the release of board 12 in alignment with its preferred feeding path. This cycle would of course be repeated for each board 12.

Referring now to FIGS. 4 and 5, the propulsion of board 12 into the edger unit (not shown) will now be described in further detail. Once board 12 has been placed in longitudinal alignment with its preferred feeding path in accordance with the present invention, and before the board 12 is released from the clamping assembly 48, a series of spiked feed rollers (typically at 96) located immediately above board 12 and along its length will be lowered by hydraulic cylinders (typically at 98) onto board 12. This will press board 12 against corresponding motorized spiked feed rollers 100 located immediately below board 12 which will propel board 12 longitudinally along the direction indicated by arrow 2 into motorized top and bottom spiked feed rollers assembly 101 and finally into the edger unit (not shown). It is to be noted that in operation, the board 12 will not be released by clamping assembly 48 before it is seized and starts to be longitudinally propelled by the series of spiked feed rollers 96 and 100. This is of course possible since the spiked rollers 58 of clamping assembly 48 are freely rotatable in the same direction as spiked feed rollers 96 and 100.

Various other alternative or optional embodiments of infeed system 10 will now be described wherein like reference numerals indicate components common to this these alternative or optional embodiments.

Referring now to FIG. 4, an alternative embodiment of the infeed system 10 is shown. The embodiment shown is designed to effectively handle boards of varying size and length as exemplified by board 12 and board 106. In this embodiment, a third endless transverse transport chain 102 is in a space relation to endless chain 20 and a third endless transverse transport chain 102 is in a spaced relation to endless transverse transport chain. Obviously chains 18, 20, and 102 are driven in unison by torque shaft 19 and shaft 21 connected to an electric motor (not shown) under the control of the computer (not shown). Similarly, chains 32, 34, and 104 are also driven in unison by torque shaft 33 and shaft 35 also connected to an electric motor (not shown) under the control of the computer (not shown). This embodiment will permit to handle longer boards such as board 106 which would otherwise be to long for the previously described embodiment.

Figure 6:
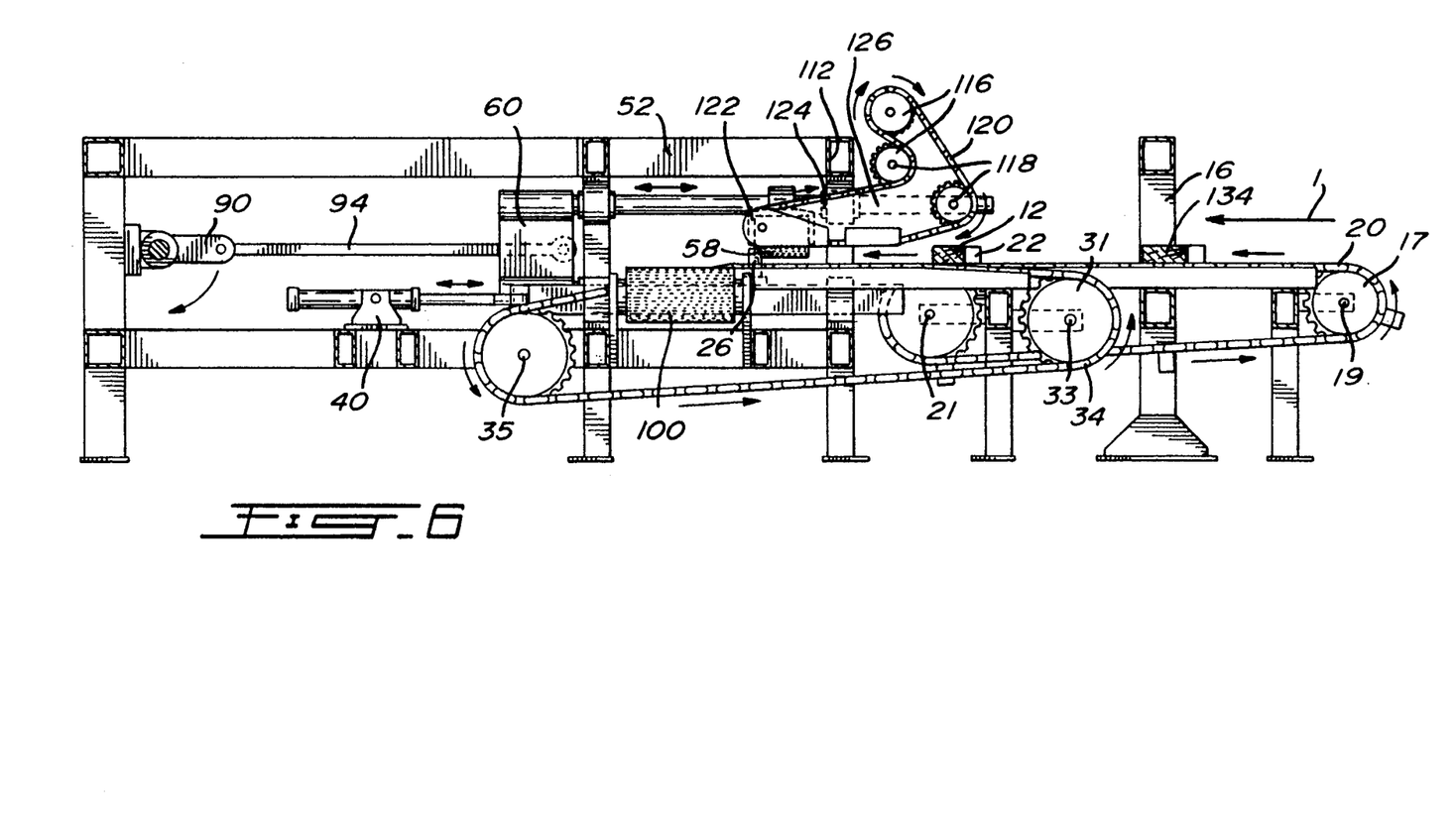
FIG. 6 is a fragmentary vertical side elevational view of the machine shown in FIGS. 1 and 4, taken generally along line 6—6 on FIG. 8 and schematically showing the transverse transport mechanism of the boards through the optical scanning station on their route to the positioning pegs and schematically showing top friction shoes to prevent the boards from bouncing or sliding out of alignment.
Figure 8:
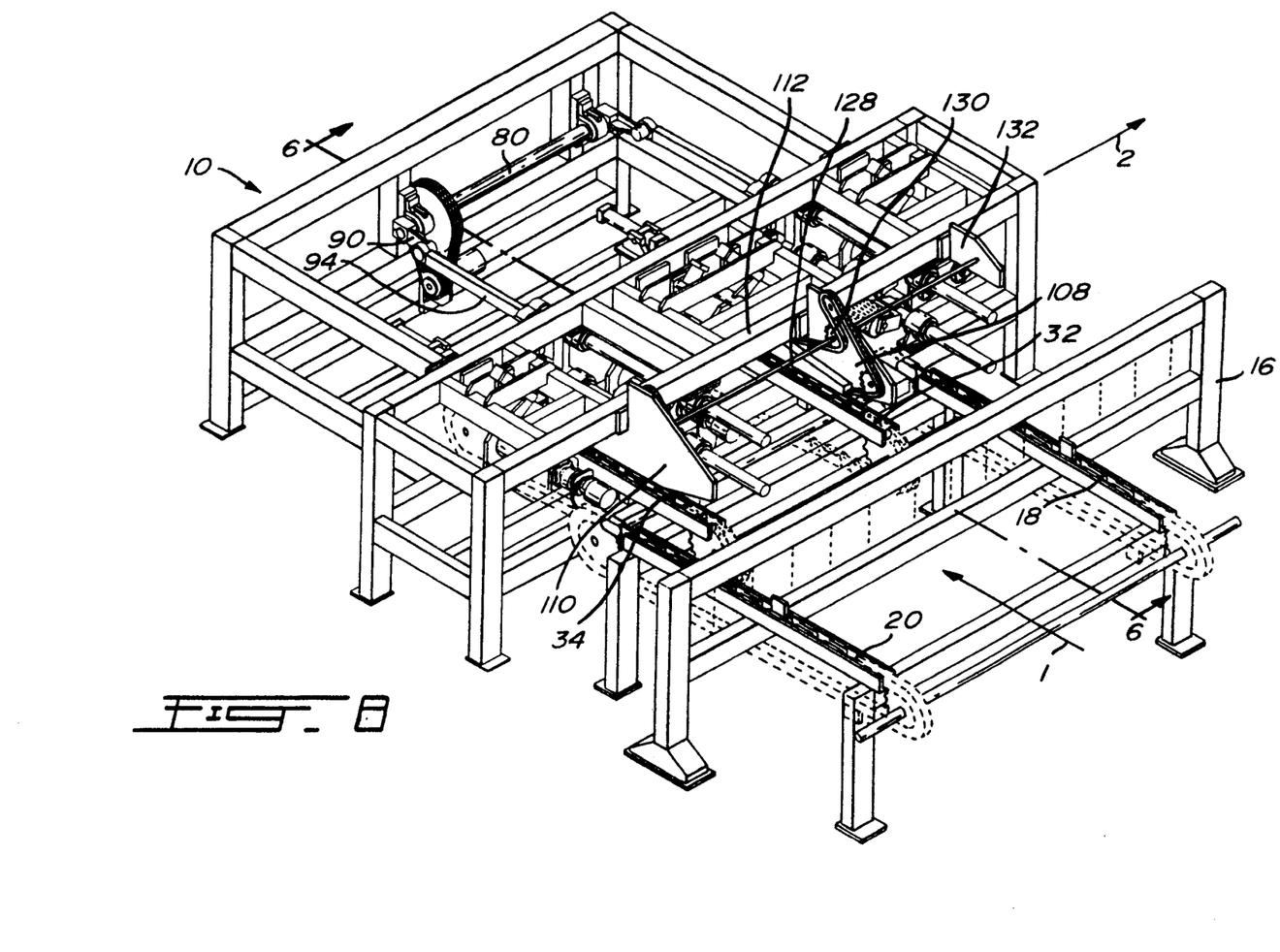
FIG. 8 is a perspective view showing the board edging infeed optimization system in accordance with the present invention which embodies top friction shoes.
Figure 9:
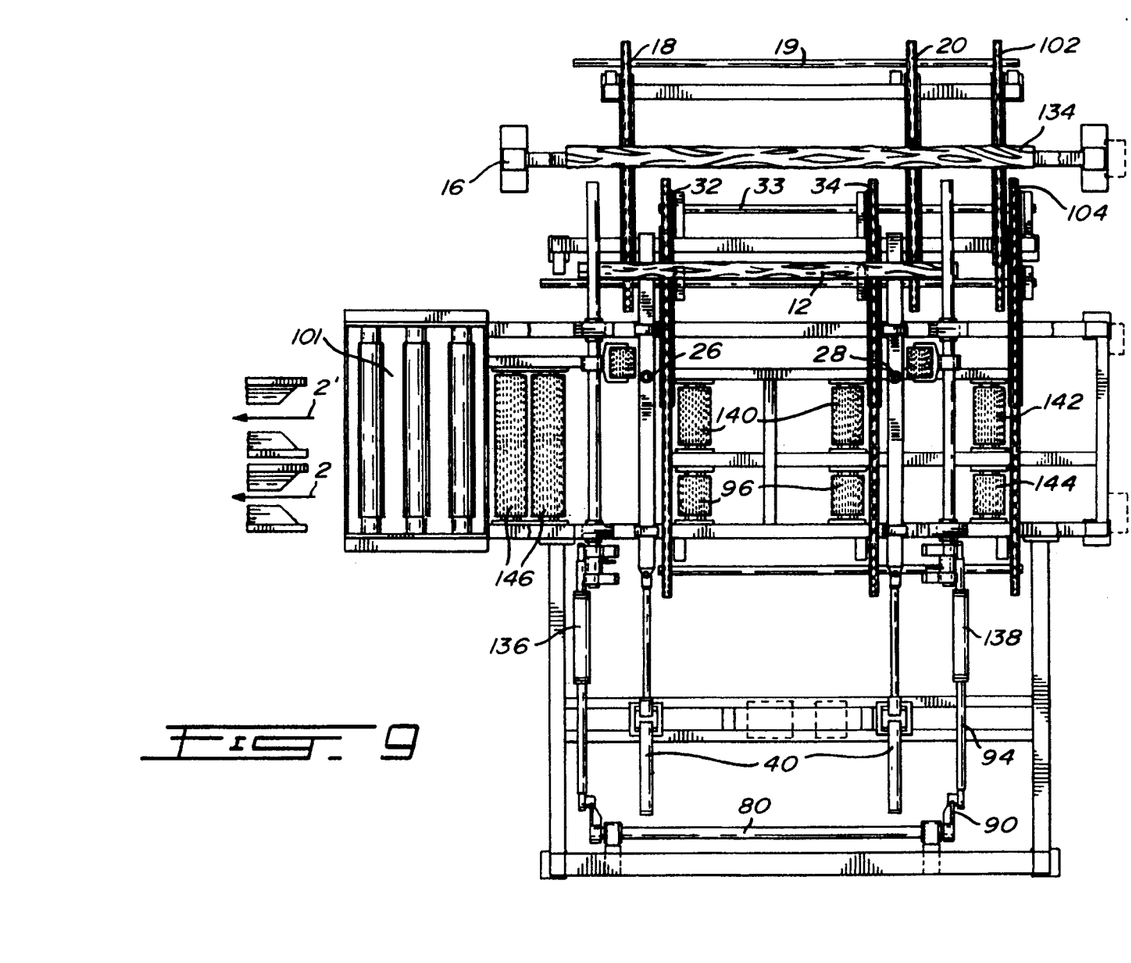
FIG. 9 is a top view of an alternate embodiment of a board edging infeed optimization system in accordance with the present invention and adapted to selectively feed boards to either of two fixed position edging saw assemblies.

Referring now to FIGS. 6 and 9, there is shown an optional embodiment of the infeed system 10. This embodiment is specifically adapted to provide an infeed system 10 which prevents boards 12 from slipping, bouncing, or sliding during their positioning in abutment against positioning pegs 26 and 28 for subsequent alignment with a preferred edging path. In FIG. 8 top friction shoes 108 and 110 are bolted on support beam 112 to overhang immediately above endless chains 32 and 34, respectively. Each friction 108 and 110 is of similar construction and consequently only one of the friction shoes, namely friction shoe 110 will be further described. Friction shoe 110 has a triangular flange 114 bolted onto support beam 112. Turning now to FIG. 6, friction shoe 110 is schematically illustrated in operation in a sectional view without triangular flange 114. Friction shoe 110 comprises four sprocket wheels (typically at 116) mounted on suitable axles (typically at 118) around which a chain belt 120 is placed to be driven on the sprocket wheels 116. A grooved teflon ® block 122 is suspended on resilient levers 124 and 126 to maintain tension on chain belt 120 so that a relatively flat portion of chain belt 120 is maintained in close parallel proximity to endless transport chain 34. Turning back to FIG. 8, one of sprocket wheels 116 is driven by drive shaft 128 which extends in a direction parallel to support beam 112 to drive a similar sprocket wheel 130 on friction shoe 108 and further extends through friction shoe 108 through a bored support flange 132 to a drive sprocket wheel (not shown) motorized by an electric motor and chain assembly (not shown) under the control of the computer (not shown).

In operation, chain 120 on each friction shoe 108 and 110 will be driven at the same linear velocity as their counterpart endless transport chains 32 and 34. It is to be understood that in this way a board 12 will be positively advanced, while minimizing its bounce or slippage, to positioning pegs 26 and 28. The resilient levers 124 and 126 on each friction shoe 108 and 110 will allow chain belt 120 to resiliently conform itself to the specific shape and thickness of a board 12. This particular embodiment is a preferred embodiment when boards 12 are being processed by the infeed system 10 while frozen or wet.

In FIG. 9 there is shown another embodiment of infeed system 10 capable of feeding workpieces of varying dimensions to more than one edger unit (not shown) in accordance with the particular size of each workpiece entering the infeed system 10. In this particular embodiment, workpieces of substantially different dimensions, exemplified by boards 12 and 134 will sequentially pass through optical scanning station 16. The size and morphology data from optical scanning station 16 will be relayed to a computer (not shown) which will calculated a preferred feeding path into a preferred edger unit. In this particular embodiment, infeed system 10 is shown as capable of alternatively feeding boards into two possible edger units (not shown) in parallel directions exemplified by arrows 2 and 2'. For example, a smaller board such as board 12 would be fed generally in the direction indicated by arrow 2 while a larger board such as board 134 would be fed generally in the direction indicated by arrow 2'.

In operation, positioning pegs 26 and 28 will be moved by servo positioner cylinders 40 as directed by the computer (not shown) so that a board 12 or 134 will travel a variable transverse distance X and reach abutment on pegs 26 and 28 in accordance with a calculated preferred feeding path alternatively in the general direction of arrows 2 or 2'. The computer (not shown) will then direct eccentric arm assembly 50 to further transversely displace board 12 or 134 by a constant distance C so that board 12 or 134 will reach its alignment with a preferred feeding path into one of two edger units (not shown). In this embodiment, eccentric arm assembly 50 is provided with servo hydraulic cylinders 136 and 138 on each linking arm 94 thereby making it possible for the computer (not shown) to direct the elongation or retraction of each linking arm 94. Therefore, clamping assembly 48 can be adequately positioned above and below boards 12 or 134 to seize and transport boards 12 or 134 to their respective preferred feeding path when the eccentric arm assembly 50 is activated as previously described. Once boards 12 or 134 have reached longitudinal alignment with their respective preferred feeding path, they will be propelled longitudinally into the appropriate edger unit (not shown) spiked feed rollers located immediately above and below boards 12 or 134 (typically at 96, 140, 142, 144, 146, and 101). As illustrated in FIG. 9, a workpiece of the dimensions exemplified by board 12 would be propelled in the general direction indicated by arrow 2 by the assemblies of spiked feed rollers (typically at 96, 146, and 101). As for a workpiece of the dimensions exemplified by board 134 it would be propelled in the general direction indicated by arrow 2' by the assemblies of spiked feed rollers (typically at 96, 142, 140, 146, and 101). As further illustrated in FIG. 9, it is to be understood that spiked feed rollers typically shown at 146 and 148 are of wider longitudinal construction to operably propel workpieces of various dimensions into either of the edger units (not shown).

It is to be noted that throughout this description, it is obviously assumed that sprocket wheels, or other rotatable or otherwise mobile parts are to be installed with appropriate bearings or lubrication so as to minimize frictional forces and energy consumption. Additionally, it is to be understood that the infeed system 10 is to be firmly affixed to the floor of the mill where it is in operation so that it will be stable as precise alignment of workpieces into the edger units is required.

Although the invention has been described above with respect to specific embodiments, it will be evident to a person skilled in the art that it may be modified and refined in various ways. It is therefore wished to have it understood that the present invention should not be limited in scope, except by the terms of the following claims.

What is claimed:

1. An apparatus for positioning an elongate cant for the infeed of the cant into an edging device capable of longitudinally cutting the cant to remove the wane edges thereof, said apparatus comprising:
   conveying means for transversely conveying the cant along a substantially straight path;
   scanning means located along the path for optically scanning the morphology of the cant and providing morphology data;
   computer means linked to the scanning means for analyzing the morphology data and calculating a longitudinal reference datum line on said cant and a preferred infeed line for said cant;

positioning means located further along the path for transversely positioning the cant at a predetermined distance away from the preferred infeed line for said cant;

moving means for displacing the cant by the predetermined distance so that the longitudinal reference datum line of said cant is placed essentially colinear with the preferred infeed line of said cant, said moving means comprising:

at least one rotatable eccentric arm linked to movable and releasable clamping means, whereby once said cant is clamped, the rotation of said eccentric arms can displace said movable clamping means, together with the cant, further along the path to a position where the reference datum line of said cant is essentially colinear with the preferred infeed line of direction and where the cant can be released by the clamping means;

feeding means for longitudinally advancing the cant along the preferred infeed line into the edging device.

2. An apparatus as in claim 1, wherein the apparatus is adapted to optionally feeding the cant to a plurality of edging devices.

3. An apparatus as in claim 1, wherein said moving means include:

an elongate member extending in a direction generally parallel to said path;

said elongate member being pivotally mounted on a rotatable eccentric arm also extending in a generally parallel direction to said path, whereby the rotation of the rotatable eccentric arm will sequentially advance and retract said elongate member along said path;

releasable clamping means coupled to said elongate member.

4. An apparatus as in claim 3, wherein the clamping means comprise:

a support bracket pivotally mounted on the elongate member;

elongate shafts extending generally along said path, located above and below the horizontal plane of advancement of the cant along said path, and rotatably mounted on said support bracket;

grip means for releasably seizing the cant mounted onto each of said elongate shafts;

actuating means for releasably causing said elongate shafts to rotate thereby causing the grips means to seize the cant.

5. An apparatus as in claims 3 or 4, wherein said elongate member is provided with fluid operated telescoping means whereby the length of said elongate member can be optionally set.

6. An apparatus as in claim 4, wherein the grip means are grip rollers rotatable in a direction transverse to said path.

7. An apparatus as in claims 3 or 4, wherein the actuating means is at least one fluid operated cylinder.

8. An apparatus as in claims 3 or 4, wherein the actuating means are two servo fluid operated cylinders.

9. An apparatus as in claims 1, 2, 3, or 4, wherein said conveying means are a plurality of parallel spaced-apart chains supported on tracks located below the horizontal plane of advancement of the cant along said path.

10. An apparatus as in claim 9, wherein said plurality is two.

11. An apparatus as in claims 1, 2, 3, or 4, wherein said positioning means are a plurality of parallel space-apart positioning pegs fixedly mounted on support beams movable along said path by linear actuating means controlled by said computer.

12. An apparatus as in claim 11, wherein said plurality is two.

13. An apparatus as in claim 11 wherein said linear actuating means are servo fluid operated linear positioning cylinders.

14. An apparatus as in claims 1, 2, 3, or 4, wherein said feeding means for longitudinally advancing the cant along the preferred infeed line into the edging device, are a plurality of motorized grip rollers.

15. An apparatus as in claims 1, 2, 3, or 4, further comprising restraining means located directly above said conveying means for resiliently maintaining the cant on said conveying means thereby controlling slippage and bouncing of the cant on said conveying means and against said positioning means.

16. An apparatus as in claim 15, wherein said restraining means are friction shoes comprising belt means mounted on resilient arms whereby said belt means are adapted to conform to the morphology of the cant during its passage thereunder.

17. A method for positioning an elongate cant for the infeed of the cant into an edging device capable of longitudinally cutting the cant to remove the wane edges thereof, said method comprising:

(a) tranversely conveying the cant on conveying means along a substantially straight path;

(b) optically scanning the morphology of the cant with scanning means located along the path for obtaining morphology data on the cant;

(c) calculating from the morphology data on the cant a longitudinal reference datum line on the cant and a preferred infeed line of the cant into the edging device;

(d) further along the path, positioning the cant at a predetermined distance away from the preferred infeed line;

(e) clamping and moving the cant by the predetermined distance, further along the path, positioning the cant and releasing the cant, whereby the longitudinal reference datum line on the cant is essentially placed colinear with the preferred infeed line of direction, comprising the steps of:

(i) clamping the cant with clamping means mounted on elongate members linked to rotatable eccentric arms (ii) rotating said eccentric arms so that the elongate members together with the clamping means and the cant are displaced further along the path;

(iii) releasing said cant from the clamping means;

(f) longitudinally feeding the cant along its preferred infeed line of direction into said edging device.

18. A method as in claim 17, wherein at least part of the step (f) occurs concurrently with the sub-step (e)-(iii), whereby the cant begins to be longitudinally fed along the preferred infeed line of direction before it is completely released by the clamping means.

* * * * *